United States Patent
Idoni et al.

(10) Patent No.: US 7,149,297 B2
(45) Date of Patent: Dec. 12, 2006

(54) NETWORKWIDE DESK SHARING WITH AUTOMATIC DEVICE RELOCATION

(75) Inventors: Michael A. Idoni, Delray Beach, FL (US); Luiz Henrique Domingos, Boca Raton, FL (US)

(73) Assignee: Siemens Communications, Inc.-Boca Raton, Boca Raton, FL (US)

( * ) Notice: Subject to any disclaimer, the term of this patent is extended or adjusted under 35 U.S.C. 154(b) by 0 days.

(21) Appl. No.: 10/610,451

(22) Filed: Jun. 30, 2003

(65) Prior Publication Data

US 2004/0264665 A1 Dec. 30, 2004

(51) Int. Cl.
*H04M 3/42* (2006.01)

(52) U.S. Cl. .................. 379/201.02; 379/201.05; 379/201.12; 379/211.02; 379/913

(58) Field of Classification Search .......... 379/201.01, 379/201.02, 201.05, 201.12, 211.02, 913
See application file for complete search history.

(56) References Cited

U.S. PATENT DOCUMENTS

| 4,899,373 A | * | 2/1990 | Lee et al. ............. 379/201.05 |
| 5,557,665 A | * | 9/1996 | Yamamoto ................. 379/198 |
| 6,252,953 B1 | * | 6/2001 | Gruchala et al. ...... 379/207.01 |
| 6,584,185 B1 | * | 6/2003 | Nixon .................. 379/201.01 |
| 6,823,055 B1 | * | 11/2004 | Mayer et al. .......... 379/201.05 |

* cited by examiner

*Primary Examiner*—Harry S. Hong

(57) ABSTRACT

A system and method for integrating a desk sharing application with a PBX telephonic user identity and feature transfer function is described. The system and method of the invention utilizes the CSTA protocol to transfer the Personal Identification Number and call forwarding attributes from a dedicated device to the shared telephone device throughout an ECP network.

20 Claims, 2 Drawing Sheets

NETWORKWIDE DESK SHARING WITH AUTOMATIC DEVICE RELOCATION

FIELD OF THE INVENTION

The present invention relates generally to shared telephonic communication devices, and more specifically, to a desk sharing system incorporating a method for automatically transferring telephonic settings and configurations from the user's telephonic device to a shared telephonic device in a telecommunication network.

BACKGROUND OF THE INVENTION

Many office environments dedicate a number of offices and their associated personal computers and telephonic devices for visiting or telecommuting staff. Desk sharing (also known as office sharing or real estate/resource hoteling) facilitates the temporary allocation of a limited number of shared resources to a greater number of users. Desk sharing is particularly suitable for office environments where employees work multiple shifts, or where office personnel tend to move between multiple locations.

Desk sharing involves reserving a particular office space for a specific time period. A desk sharing application is a software program, typically incorporating a graphic user interface (GUI), that is used to view shared office spaces and their associated devices and to allow authorized users to reserve these office spaces and resources. Authorized users can select and reserve a shared office and its associated resources from the set of available resources, for a specified period of time. At the end of the desk sharing period, the resource is released and therefore becomes ready to be reserved and allocated by a different user.

Desk sharing applications may be used to reserve a physical location along with the computing and telephonic resources associated with that location. When sharing personal computers (PC) or workstations, the user gains full access to the company computing resources, email and Internet services as a result of logging in to the Local Area Network (LAN) or Wide Area Network (WAN) from any shared and connected workstation. Furthermore, PC users maintain their own customized setting as a result of the system automatically downloading their profile to the utilized workstation upon logging in to the network. The utilization of the user's standard profile while using the shared workstation allows that user to retain the preferred work environment, and consequently improve overall efficiency.

The telephonic network environment is different from the LAN or WAN network. In telephonic networks, an Enterprise Communication Platform (ECP) represents a single node in the communication network, typically comprising a PBX, a Common Access Platform (CAP), a desk sharing server and associated telephonic equipment. The interconnection of a plurality of these ECP nodes forms an "ECP network". The various components of the ECP are connected using a number of standard or proprietary interfaces. For intra-node applications (i.e. within a single ECP), local desk sharing capability exists for the user to configure the new telephonic device with the desired settings either using the Private Branch Exchange (PBX) "autoset relocate" function (using one of the supported PBX interfaces) or by manually configuring the new device. An example of intra-ECP applicability achieved via the integration of autoset relocate with desk sharing is described in co-pending application entitled "Desk Sharing With Automatic Device Relocation" and commonly assigned to the assignee hereof, which application is incorporated herein by reference.

At the present time, ECP networks (comprising a plurality of ECPs) do not allow the standard device features of a telephone user to be transferred automatically to another telephonic device in connection with a desk sharing procedure. Nonetheless, a limited telephonic feature transfer is available for devices in an ECP network. Namely, when modem connectivity is utilized to access the PBX administrative terminal and execute the "modem relocate" function of the PBX between ECPs, the user is able to configure call forwarding and message waiting indication for the shared telephonic device. The modem relocate function allows the user to access the administrative terminal at the ECP (via a modem) and execute commands that result in mirroring the call waiting indicator and call forwarding of the home telephonic device at the shared telephonic device. Alternatively, the user may manually program the newly shared telephonic device with the desired features in a separate procedure and with no integration with the desk sharing application.

However, the prior art has several limitations. In particular, the modem relocate function is not completely integrated with the desk sharing application, thus requiring the user to separately perform office space reservation using the desk sharing application and device impersonation using modem connectivity. Further, it does not provide transfer of feature or telephonic device identity between telephonic devices belonging to two different ECP nodes (current capability is limited to call forwarding and message waiting indicator). Since the full feature set is not transferred, some of the features and attributes of the new telephonic device will not correctly reflect the actual user (such as the name display and billing information). While manual configuration of shared telephonic devices is an option, as more features are added to telephonic devices the manual configuration task becomes more difficult and time consuming, e.g. to accommodate users who frequently use the shared device for only short periods of time. Furthermore, deletion of or otherwise resetting a prior user's configured features from the shared device might be necessary in the prior art.

SUMMARY AND OBJECTS OF THE INVENTION

The foregoing and other problems and deficiencies in current desk sharing systems are solved and a technical advance is achieved by the present invention for a more extensive and integrated desk sharing system and method operable in an ECP network or within a single ECP.

Under the present invention, Computer Supported Telephony Application (CSTA) compatible ECP nodes will posses an expanded networkwide telephonic device impersonation capability that is integrated with the desk sharing application. The present invention in part, essentially impersonates the network Personal Identification Number (PIN) and call forwarding attributes of a default telephonic device at a shared telephonic device, using the CSTA connectivity module. The CSTA link is used to communicate with different ECPs and to access the call control for each ECP. It also allows the execution of the modem relocate commands at the ECP.

Accordingly, when a user selects to temporarily use a shared office location and its associated telephonic device, the device impersonation capability of the present invention allows feature settings to be transported from the default (Home) dedicated telephonic device to the shared (Host)

device, for the duration of a reservation period. The transported telephonic device profile includes inter alia the network PIN and call forwarding. These two features (which can be activated, e.g., using CSTA protocol) represent an important and highly desirable subset of the complete feature set. Network PIN allows the transfer of essential telephonic services including the desired identity and feature functionality, such as caller identity, class of service, call detail recording, dialing restrictions, mailbox and voice mail integration and dynamic grouping features (for example, pickup groups). Call forwarding allows automatic transfer of calls from the original user's device to the shared device, thus making it possible for the client to be reached with little delay, if not immediately.

According to the present invention, in an alternative embodiment the default user's telephonic device could be an actual dedicated telephonic device or a virtual device in the form of a database entry representing the telephony identity and preferred configuration for that client.

Thus, it is an object of this invention to provide a method for transferring a caller network PIN and call forwarding attributes from a first telephonic device to a second shared telephonic device, within the same or in different CSTA capable ECPs, automatically and dynamically.

It is also an object of present invention to integrate the desk sharing application software with the telephonic device feature transport.

It is another object of this invention to emulate and expand the existing functionality of the "modem relocate" feature transfer function to include network PIN and call forwarding.

It is still another object of the present invention to transfer (where "transfer" as used here can include a simple mirroring of functionality or an actual transfer of functions, as will be understood by those skilled in the art) telephonic properties and feature set between the user default telephonic device and the allocated shared device, where the default device can be an actual or virtual telephonic device.

BRIEF DESCRIPTION OF THE DRAWINGS

The foregoing and other features and advantages of the present invention will become more apparent in light of the following detailed description of exemplary embodiments thereof, as illustrated in the accompanying drawings, where.

DETAILED DESCRIPTION

The present invention integrates the desk sharing application with the telephonic device impersonation feature through the utilization of the network connectivity of the ECP network. This invention inter alia integrates the ECP call control capabilities with the desk sharing application. Under the present invention, when a client uses the desk sharing application to reserve a shared office space or location that has an associated telephonic device, a connection to the ECP is established at the Common Access Platform (CAP) and the client's network PIN and call forwarding options are transferred from the user default device to the newly allocated physical device.

Figure 1:
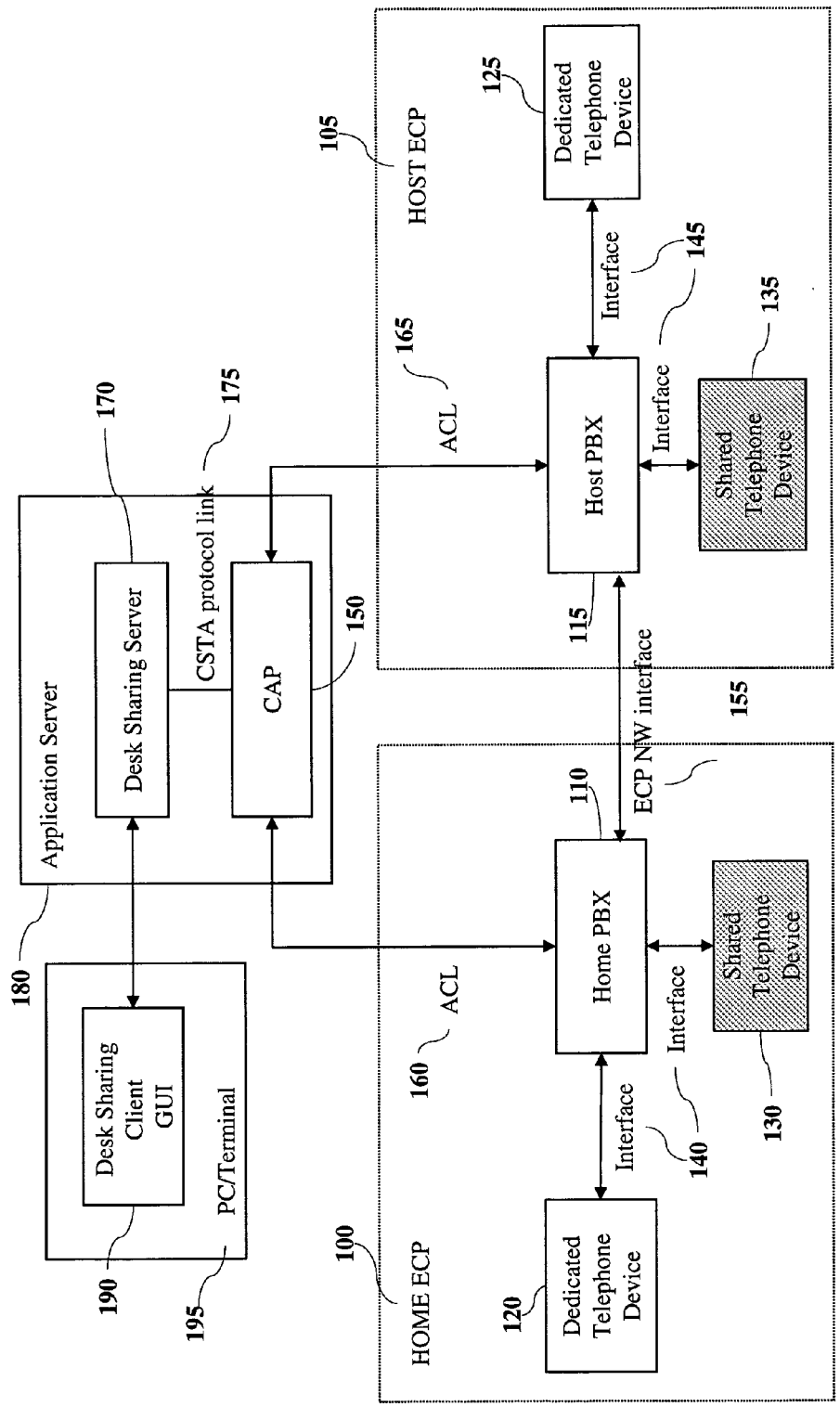
FIG. 1 is an illustrative block diagram of two CSTA compatible ECP nodes accessing a desk sharing server according to one embodiment of the present invention.

FIG. 1 is a block diagram of an illustrative embodiment of the present invention for an ECP network consisting of two CSTA compatible ECP nodes. CSTA is an ECMA (European Computer Manufacturer's Association) standard that is widely employed by PBX manufacturers to facilitate the interworking of applications to ECPs from different vendors. In the illustrative embodiment of FIG. 1, the Home ECP 100 comprises a Home PBX 110, a dedicated telephone device 120 and a shared telephone device 130. Both the dedicated (i.e. default or home) telephone device 120 and the shared (i.e. host) telephone device 130 are connected to the Home PBX 110 using the proprietary interface 140. The host ECP 105 also comprises a Host PBX 115, a dedicated telephone device 125 and a shared telephone device 135. The dedicated telephone device 125 and the shared telephone device 135 are connected to the Host PBX 115 via the proprietary interface 145. It will be understood by one skilled in the art that any interface (e.g. other proprietary or standard) may be utilized instead of the proprietary interfaces 140 and 145 so long as it accommodates the telephone device interface with the deployed Home PBX 110 and Host PBX 115, respectively. Home ECP 100 and Host ECP 105 are interconnected via the ECP Networkwide (NW) interface 155. ECP NW interface 155 is a networking connection for transporting voice and data across Home ECP 100 and Host ECP 105 using various traditional private or standard networking protocols for intercommunication (e.g. ISDN, ECMA-QSIG).

The Home PBX 110 and Host PBX 115 are connected to the CAP 150. In one embodiment, the ACL interfaces 160 and 165 are used to provide a call control connection between the CAP 150 and Home PBX 110 and the Host PBX 115, respectively. In alternative embodiments, a standard interface (e.g. CSTA) or a different proprietary interface can be employed, as will be understood. The CAP 150 is part of the Application Server 180 that connects the Home ECP 100 and the Host ECP 105. In this illustrative embodiment, both the CAP 150 and the desk sharing server 170 reside in the Application Server 180 and interface with each other via the CSTA protocol link 175. In an alternative embodiment, a desk sharing server may reside outside the Application Server 180 and connect to the CAP 150 using the same CSTA protocol link 175.

Users can access the desk sharing server and perform desk sharing and telephonic device impersonation via a desk sharing client GUI 190 running on a terminal or a PC 195. In such illustrative embodiment, the desk sharing server 170 performs the function of a server application, allowing the user to request the device impersonation feature between the dedicated telephone devices (120 or 125) and the shared telephone devices (130 or 135).

In the illustrative embodiment of FIG. 1, the telephone devices 120, 130, 125 and 135 may be, e.g., an IP phone, an ISDN phone or a digital PBX telephone. Alternatively, the dedicated telephone devices 120 and 125 may be virtual telephones that are represented as a database entry at the ECP indicating the user identity and the preferred telephonic settings. Under the present invention, the dedicated and shared telephone devices may belong to the same ECP or to different ECPs.

The Application Server 180 and CAP 150 are logical blocks that represent an architectural view of any ECP that is capable of communicating using the CSTA protocol. The desk sharing server is normally co-located to one ECP, but it needs to coordinate with the other ECPs. Both the Home ECP 100 and the Host ECP 105 need to be CSTA compatible, but do not necessarily need to have the same capabilities.

CAP 150 is a middleware that connects to the various ECP nodes and acts as a translator between these various nodes and provides the applications with a common and unified call control interface. Furthermore, CAP 150 exposes a CSTA protocol link 175 that allows communication with CSTA compatible solutions, such is as the desk sharing server 170. Thus, the administrator or desk sharing client user may use a desk sharing client GUI 190 from a terminal or a PC 195 to connect to the Desk Sharing Server 170 and subsequently request the networkwide relocation to the corresponding ECP via the CSTA Link 175. Furthermore, the ability of CAP 150 to support a standard protocol further facilitates the integration of external (third party) PBXs/ECPs.

When an authorized dedicated telephone user (for example 120), or an administrator representing the telephone user, accesses the desk sharing server 170 via PC 195 and requests to reserve a shared office space and the corresponding shared telephone device (for example, shared telephone 135 at Host ECP 105) the desk sharing server application initiates the transaction. If a telephone device is associated with the selected shared office space, a request is submitted (via the CSTA protocol link 175) to the ECP call control link at CAP 150 to perform the features transfer.

Figure 2:
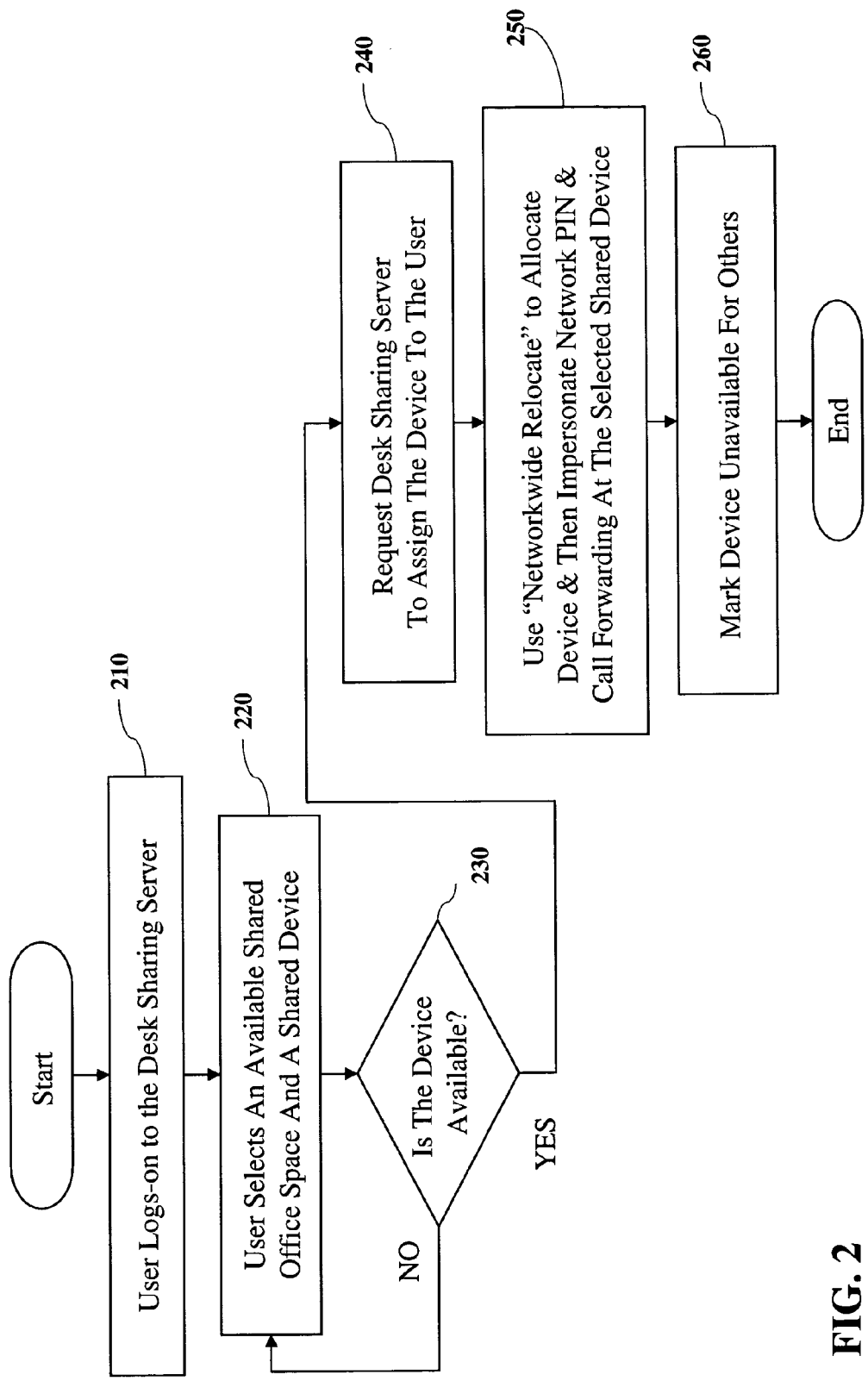
FIG. 2 is a flow diagram of the steps involved in performing the device impersonation according to an illustrative embodiment of the present invention.

FIG. 2 illustrates the procedure involved in networkwide device impersonation according to an illustrative embodiment of the present invention. The present invention allows the user to interface to the GUI of the desk sharing application (residing on the client PC 195). The procedure starts when the administrator, or an authorized telephone user, logs-on to the desk sharing system and executes the desk sharing application at 210. The user then identifies a shared working area and selects an associated shared telephone device at 220. The desk sharing application verifies the availability of the requested shared telephone device at 230. If the shared telephone device has already been allocated to another client or otherwise unavailable, the user is directed to restart the selection process at 220. Otherwise, if the shared telephone device is available, the desk sharing application assigns the shared telephone device to the requesting user at 240.

Next, networkwide relocate functionality is emulated to impersonate the network PIN and call forwarding at 250. Specifically, impersonation is achieved by using the pre-configured user dedicated telephone device's PIN (which is stored in the desk sharing server database) and activating it together with the call forwarding feature at the administrative library of the Host ECP. This impersonation causes the network PIN and call forwarding attributes of the default telephonic device to be reflected at the shared telephone device. At the end of the reservation period, or when the user terminates the reservation of the shared device, the functional attributes of the dedicated and shared devices are reset to the pre-desk sharing status.

Under the present invention, networkwide relocate may be performed for both intra-ECP and inter-ECP sharing conditions, as long as both ECPs are CSTA capable. In one embodiment, the ECP administrator is able to restrict the use of the networkwide relocate to, e.g., inter-ECP device sharing conditions and use the autoset relocate based desk sharing for intra ECP telephone device sharing conditions (as disclosed in the co-pending application referenced above). In such embodiment, the desk sharing application will determine if the dedicated telephone device and the shared telephone device belong to the same ECP, and subsequently perform the appropriate desk sharing application based on the ECP administrator selection.

When the device impersonation or relocation is complete, the application reports the status of the desk sharing procedure to the user and marks the shared device as unavailable to other users for the duration of the desk sharing period at 260.

It is possible to extend the invention to other applications that may benefit from the integration with telephony applications. For example, using a Personal Digital Assistant (PDA) or a comparably equipped cellular telephone to browse through available vacant seats in a theater, a stadium, or a hotel and consequently utilize stored client preferences (location, price range, etc.) to narrow the search for a specific location. Furthermore, the invention may be used for the assignment of "fixed resources" in order to move telephone users around office permanently or for an extended period of time, using a different platform such as, for example the location assignment application instead of the desk sharing application described herein.

Without departing from the spirit and scope of the invention. It is therefore intended that the present invention is not limited to the disclosed embodiments but should be defined in accordance with the claims, which follow.

We claim:

1. A desk sharing method for transferring personalized telephone properties and feature set selection from a dedicated telephone device to a shared telephone device, comprising the steps of:
    executing a desk sharing application;
    reserving an available shared telephone device through said desk sharing application; and
    said desk sharing application automatically transferring network Personal Identification Number (PIN) and device Call Forwarding (CFW) attributes from said dedicated telephone device to said shared telephone device.

2. The method of claim 1 wherein said dedicated telephone device and said shared telephone device belong to a single ECP node in a Computer Supported Telephony Application (CSTA) compatible ECP network.

3. The method of claim 1 wherein said dedicated telephone device and said shared telephone device belong to two different ECP nodes in a Computer Supported Telephony Application (CSTA) compatible ECP network.

4. The method of claim 1 wherein said desk sharing application is integrated with a call control interface of a Computer Supported Telephony Application (CSTA) compatible ECP network.

5. The method of claim 1 wherein said desk sharing application comprises a graphic user interface (GUI), and said step of reserving said available shared telephone device includes reserving at least one other shared resource, shared telephone devices and associated other shared resources being viewable and reserved by said desk sharing application through said GUI.

6. The method of claim 5 wherein said other shared resource includes a shared office space.

7. The method of claim 5 wherein said other shared resource includes a shared computer.

8. The method of claim 1 wherein said dedicated telephone device is a virtual telephone device represented by a database entry at an ECP node in a Computer Supported Telephony Application (CSTA) compatible ECP network.

9. The method according to claim 1 wherein said desk sharing application employs a Computer Supported Telephony Application (CSTA) protocol link to perform said automatic transfer of said network PIN and said device CFW attributes from said dedicated telephone device to said shared telephone device.

10. The method of claim 1 wherein said desk sharing application resides outside of said ECP network.

11. A desk sharing apparatus for transferring personalized telephone properties and feature set selection from a dedicated telephone device to a shared telephone device, comprising:

means for executing a desk sharing application;

graphic user interface (GUI) means responsive to said desk sharing application, said GUI means for viewing available telephone devices in a Computer Supported Telephony Application (CSTA) compatible ECP network;

means for reserving a viewed available shared telephone device; and means for automatically transferring network Personal Identification Number (PIN) and device Call Forwarding (CFW) attributes from said dedicated telephone device to a reserved said shared telephone device.

12. The apparatus of claim 11 wherein said dedicated telephone device and said shared telephone device belong to a single ECP node.

13. The apparatus of claim 11 wherein said dedicated telephone device and said shared telephone device belong to two different ECP nodes.

14. The apparatus of claim 11 wherein said desk sharing application is integrated with a call control interface of said CSTA compatible ECP network.

15. The apparatus of claim 11 wherein said means for reserving said available shared telephone device includes means for reserving at least one other shared resource viewed through said GUI means.

16. The apparatus of claim 15 wherein said other shared resource is a shared office space.

17. The apparatus of claim 15 wherein said other shared resource is a shared computer.

18. The apparatus of claim 11 wherein said dedicated telephone device is a virtual telephone device represented by a database entry at an ECP node in said CSTA compatible ECP network.

19. The apparatus according to claim 11 wherein the executing said desk sharing application employs a CSTA protocol link in said means for automatic transfer of said network PIN and said device CFW attributes from said dedicated telephone device to said shared telephone device.

20. The apparatus of claim 11 wherein said desk sharing application resides outside of said ECP network.

* * * * *